April 9, 1929.  H. R. McILHENNEY  1,708,392
PRODUCTION OF SODIUM STANNATE
Filed April 22, 1926
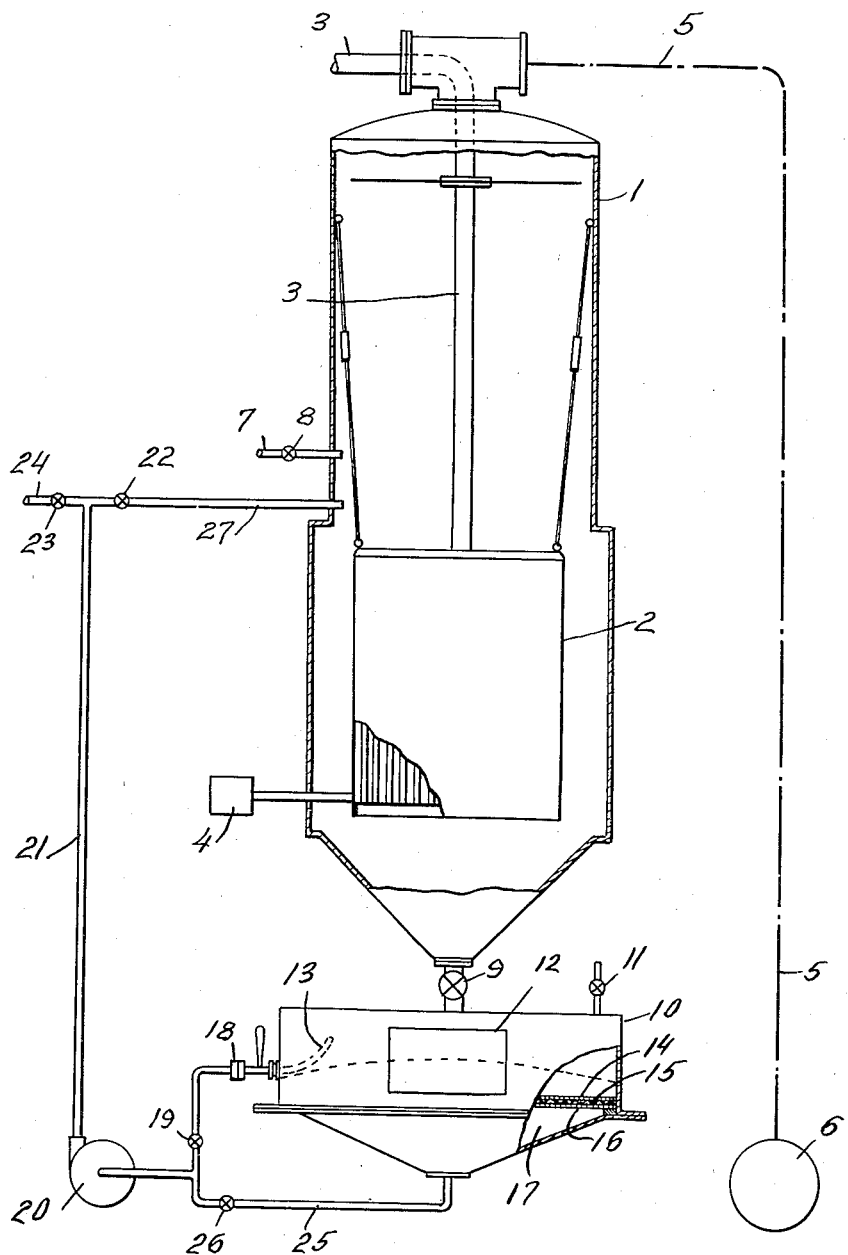
INVENTOR
Horace R. McIlhenney
BY
Pennie, Davis, Marvin & Edmonds
ATTORNEYS Patented Apr. 9, 1929.

1,708,392

UNITED STATES PATENT OFFICE.

HORACE RUSSELL McILHENNEY, OF RAHWAY, NEW JERSEY, ASSIGNOR TO VULCAN DETINNING COMPANY, OF SEWAREN, NEW JERSEY, A CORPORATION OF NEW JERSEY.

PRODUCTION OF SODIUM STANNATE.

Application filed April 22, 1926. Serial No. 103,808.

This invention relates to the production of sodium stannate and has for its object the provision of certain improvements in the production of sodium stannate. A particular object of the invention is the provision of an improved method of manufacturing sodium stannate of a high grade of purity. Another object of the invention is the provision of certain improvements in the separation by crystallization of sodium stannate from an aqueous solution containing the same, and especially from such a solution containing also substantial amounts of sodium carbonate.

Sodium stannate is customarily manufactured by treating tin-bearing materials, such as metallic tin, tin alloys, tin salts or tin compounds, with sodium hydroxide in the presence of an oxidizing agent such as sodium nitrate except to the extent that tin-oxide is present. In some cases, the sodium hydroxide is fused and the tin-bearing materials are subjected to the action of the fused bath, and in other instances the tin-bearing materials are treated with an aqueous solution of sodium hydroxide. In either case, the sodium stannate is ultimately obtained in an aqueous solution. The aqueous solution of sodium stannate is then evaporated and cooled, whereupon the sodium stannate crystallizes out, and may be separated from the mother liquor by filtering, centrifuging or other appropriate means.

The treatment of the tin-bearing material with sodium hydroxide whether fused or in aqueous solution is usually conducted in an open vessel. Accordingly, in the course of the treatment operation, sodium hydroxide comes in contact with the atmosphere and a chemical reaction takes place between the carbon dioxide of the atmosphere and the sodium hydroxide, whereby sodium carbonate is formed. The formation of sodium carbonate is more pronounced in the case of the aqueous solution of sodium hydroxide than in the fused bath of sodium hydroxide. Vigorous boiling or agitation of either the fused bath or the aqueous solution materially promotes the formation of sodium carbonate, since it brings a greater surface of sodium hydroxide into contact with the atmosphere. The aqueous solution of sodium stannate thus inevitably contains a certain percentage of sodium carbonate, as a result of the chemical reaction between the sodium hydroxide and the carbon dioxide of the atmosphere.

In addition to the formation of sodium carbonate in the manner just described, the aqueous solution of sodium stannate usually picks up sodium carbonate from other sources. Thus, sodium carbonate may be deliberately added to the reaction mixture, as, for example, for the purpose of lowering the fusing temperature of a molten bath, or for otherwise promoting the reaction. Again, sodium carbonate is often present as an impurity in the sodium hydroxide or in other reagents employed.

The aqueous solution of sodium stannate, always containing more or less sodium carbonate, is concentrated by evaporation and then cooled, whereupon sodium stannate contaminated with sodium carbonate crystallizes out of the solution. Heretofore the amount of impurities, for the most part sodium carbonate, in commercial sodium stannate, has been very considerable, frequently from 40 to 70%. In other words, the sodium stannate heretofore found on the market of so-called "commercial purity" frequently contains only from about 12 to 30% of tin (calculated as metallic tin).

The present invention contemplates certain improvements in the production of sodium stannate as a result of which a commercial product of high grade, that is high in tin content, can be uniformly produced. I have found that when an aqueous solution of sodium stannate is evaporated to a point at which sodium stannate crystals separate from the hot solution, such crystals are relatively pure and only slightly contaminated with sodium carbonate. This I believe is due to the fact that while the solubility of sodium stannate is practically the same in hot and cold solutions, the solubility of sodium carbonate is much greater in hot solutions than in cold solutions. Hence, when sodium stannate crystallizes from a hot solution without substantial cooling, only a very small amount of sodium carbonate contaminates the sodium stannate crystals, whereas if the solution was cooled after concentration, as heretofore the customary practice, the solubility of sodium carbonate would be so greatly depressed that large quantities would crystallize out along with the sodium stannate.

My present invention accordingly involves concentrating an aqueous solution of sodium stannate by evaporation and separating sodium stannate from the resulting hot solution by crystallization. Preferably the evaporation is conducted in the absence of atmospheric air as, for example, in a closed vessel, and in my preferred practice a high vacuum is maintained in the vessel during the evaporation. The evaporation is carried to the point at which a substantial amount of sodium stannate crystallizes from the hot solution, while substantially all other sodium salts remain dissolved in the residual hot mother liquor. Thus, when the proper density or concentration has been reached, as determined by a preliminary trial of a test portion of the original solution, the hot concentrated solution is allowed to stand, with only such cooling as results from radiation, and the fine crystals of sodium stannate are allowed to settle by gravity from the hot mother liquor.

In carrying out the present invention, in its preferred and complete aspect, the aqueous solution of sodium stannate containing more or less sodium carbonate is evaporated by heating under reduced pressure until a concentration is reached at which a substantial proportion of the sodium stannate in solution will crystallize out of the hot solution. Crystallization of sodium stannate from the hot solution then takes place while the solution is maintained under reduced pressure and at a temperature sufficiently high to substantially inhibit the crystallization from solution of sodium carbonate. The resulting sodium stannate crystals, as they settle by gravity in the hot solution, are collected on a porous medium. The bulk of the residual hot mother liquor is withdrawn from above the layer of crystals collected on the porous medium, and the remainder of the residual mother liquor is drawn through the layer of crystals by the application of a vacuum or reduced pressure.

In the single figure of the accompanying drawing, I have illustrated an apparatus particularly adapted for practicing the improvements of the present invention. The principles of the invention and my preferred mode of practicing these principles will be best understood from the following description of the apparatus illustrated in the drawing and its method of operation. It is to be understood that the invention is not limited to an apparatus of the particular construction illustrated in the drawing but may be practiced in various types and forms of apparatus.

The apparatus illustrated in the drawing comprises a closed vessel or evaporator 1. A steam chest 2 is suspended in the lower part of the evaporator 1. The steam chest has a steam inlet pipe 3 and a steam trap 4 operatively associated therewith.

The closed evaporator 1 is connected through a pipe 5 to a vacuum pump 6. The aqueous solution of sodium stannate to be evaporated is supplied through the inlet pipe 7 having a valve 8. The bottom of the evaporator 1 is conical and terminates in a discharge outlet having a valve 9 and communicating with a closed filter chest 10.

A porous filter medium is mounted within the chest 10. In the drawing, this medium is shown as composed of an upper perforated metal screen 14 and a lower perforated metal screen 16 with a metallic filter cloth 15 interposed between the screen. The conically shaped bottom of the chest 10 communicates with a discharge pipe 25 having a control valve 26.

An adjustable discharge pipe 13 extends through the side of the filter chest 10, above the filter medium, and is connected by appropriate piping, including a flexible joint 18 and a valve 19, to a solution or liquid pump 20. The flexible joint connection 18 permits the discharge pipe 13 to be adjusted so as to raise or lower its open end. The filter chest is further provided with a relief valve 11 and an air-tight door 12.

The solution pump 20 is connected by a pipe 21 to both a discharge pipe 24, having a valve 23, and a pipe 27 communicating with the evaporator 1. The pipe 27 has a valve 22.

In the practice of my invention in the apparatus illustrated in the drawing, the aqueous solution of sodium stannate, usually containing substantial amounts of sodium carbonate, is introduced into the closed evaporator 1 through the supply pipe 7. Steam is supplied to the chest 2 and a high vacuum, for example 26 to 28 inches, is maintained in the evaporator by the vacuum pump 6. The solution undergoing evaporation is circulated by means of the pump 20. To this end, the valves 8, 19 and 23 are closed and the valves 9, 26 and 22 are open. The solution is drawn from the evaporator 1 into the filter chest 10 and through the filter screen into the pipes 25, 21 and 27, and hence back into the evaporator. This circulation serves to keep the solution at a uniform density. When the proper concentration or density has been reached by the evaporation of the solution, the steam supplied to the chest 2 is shut off and the pump 20 is stopped. The proper concentration or density is determined by a preliminary test of a trial batch of the solution, and is the density at which substantially all, or a substantial proportion, of the sodium stannate is crystallized while the solution is hot, in the form of fine crystals, while practically none of the other salts present in the solution are so precipitated.

The evaporated or concentrated solution is then allowed to remain quiescent in the closed evaporator, without cooling other than that due to radiation, until the finer crystals of sodium stannate have settled by gravity into the filter chest 10. The valve 9 is then closed and as much as possible of the mother liquor above the bed of crystals on the porous medium in the filter chest is removed by pumping off through the pipe 13. The pipe 13 is turned during the pumping so that it is always below the surface of the liquor. The remainder of the mother liquor is then drawn through the bed of crystals on the porous medium by closing the valve 19 and opening the valve 26 and by maintaining a vacuum in the space below the porous medium. The removal of the mother liquor by this method is very efficient since the fineness of the sodium stannate crystals permits the formation of a compact layer on the filter screen and this layer has no tendency to form channels. Moreover, the filter bed is relatively broad in proportion to its height so that the crystals are distributed over a large area and the bed is not therefore too thick to prevent efficient filtering.

The door 12 of the filter chest 10 is now opened and the crystals of sodium stannate removed. The resulting sodium stannate product is in the form of very fine crystals of high purity containing approximately 38 to 43% tin, with a minimum of other sodium salts and also relatively free of moisture. This sodium stannate product is readily soluble in hot or cold water and when so dissolved shows a minimum of suspensoids.

If desired, the mother liquor, after removal of the sodium stannate, may be evaporated further to separate other sodium salts from the sodium hydroxide in the mother liquor, and the remaining mother liquor may then be concentrated by further evaporation after the separation of these salts.

The improvements of the present invention are applicable to the treatment of aqueous solutions of sodium stannate obtained in any way. Ordinarily, such solutions will result from the recovery of tin from such tin-bearing materials as ores, tin alloys, tin scrap and the like. Various procedures and reagents may be employed in the treatment of such tin-bearing materials for the production of an aqueous solution of sodium stannate. The present invention is not particularly concerned with the method employed in producing the aqueous solution of sodium stannate, but relates more especially to the recovery of sodium stannate from aqueous solutions containing the same.

I claim:

1. The improvement in the production of sodium stannate from tin-bearing materials in the course of which an aqueous solution of sodium stannate is obtained, which comprises concentrating the solution by heating until a substantial proportion of sodium stannate crystallizes from the hot solution while substantially all of the other sodium salts remain dissolved therein, and separating the resulting sodium stannate crystals from the residual hot solution whereby the contamination of the sodium stannate crystals with other sodium salts is relatively small.

2. The improvement in the production of sodium stannate from tin-bearing materials in the course of which an aqueous solution of sodium stannate is obtained, which comprises concentrating the solution by heating in the course of which the solution is continuously circulated until a substantial proportion of sodium stannate crystallizes from the hot solution while substantially all of the other sodium salts remain dissolved therein, and separating the resulting sodium stannate crystals from the residual solution without substantially lowering the temperature thereof whereby the contamination of the sodium stannate crystals with other sodium salts is relatively small.

3. The improvement in the production of sodium stannate from tin-bearing materials in the course of which an aqueous solution of sodium stannate and sodium carbonate is obtained, which comprises evaporating the solution by heating until a concentration is reached at which a substantial proportion of sodium stannate will crystallize out of the hot solution while substantially all of the sodium carbonate will remain dissolved therein, permitting the crystals of sodium stannate to settle from the hot solution upon a porous medium, and withdrawing the residual hot solution from the layer of crystals collected on the porous medium.

4. The improvement in the production of sodium stannate from tin-bearing materials in the course of which an aqueous solution of sodium stannate and sodium carbonate is obtained, which comprises concentrating the solution by heating in the course of which the solution is continuously circulated until a substantial proportion of sodium stannate crystallizes from the hot solution while substantially all of the sodium carbonate remains dissolved therein, permitting the crystals of sodium stannate to settle from the hot solution upon a porous medium, and withdrawing the residual hot solution from the layer of crystals collected on the porous medium.

5. The improvement in the production of sodium stannate from tin-bearing materials in the course of which an aqueous solution of sodium stannate and sodium carbonate is obtained, which comprises evaporating the solution by heating under reduced pressure until a concentration is reached at which a substantial proportion of the sodium stannate in solution will crystallize out of the hot solution while the sodium carbonate remains in solution, and effecting the crystallization of sodium stannate from the hot solution and the separation of the resulting sodium stannate crystals from the residual mother liquor while maintaining the solution under reduced pressure and at a temperature sufficiently high to substantially inhibit the crystallization from solution of sodium carbonate.

6. The improvement in the separation by crystallization of sodium stannate from an aqueous solution containing the same together with sodium carbonate, which comprises heating the solution under reduced pressure until a concentration is reached at which a substantial proportion of sodium stannate will crystallize out of the hot solution while substantially all of the sodium carbonate will remain dissolved therein, and permitting the crystallization of sodium stannate from the hot solution, and effecting the separation of the resulting sodium stannate crystals from the residual solution without substantially lowering the temperature thereof whereby the contamination of the sodium stannate crystals with sodium carbonate is relatively small.

7. The improvement in the separation by crystallization of sodium stannate from an aqueous solution containing the same, which comprises evaporating the solution by heating under reduced pressure until a concentration is reached at which a substantial proportion of the sodium stannate in solution will crystallize out of the hot solution while any other sodium salt present remains in solution, permitting the crystallization of sodium stannate from the hot solution while maintaining the solution under reduced pressure, collecting the resulting sodium stannate crystals as they settle in the solution on a porous medium, withdrawing the bulk of the residual mother liquor from above the layer of crystals collected on the porous medium, and drawing the remainder of the residual mother liquor through the layer of crystals by the application of a reduced pressure.

In testimony whereof I affix my signature.

HORACE RUSSELL McILHENNEY.